E. J. LEE.
BRAKE.
APPLICATION FILED AUG. 22, 1916.
1,264,820.
Patented Apr. 30, 1918.
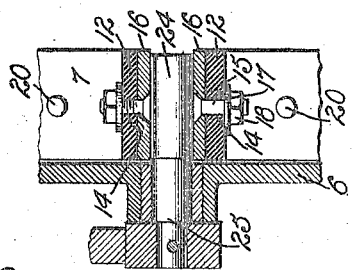
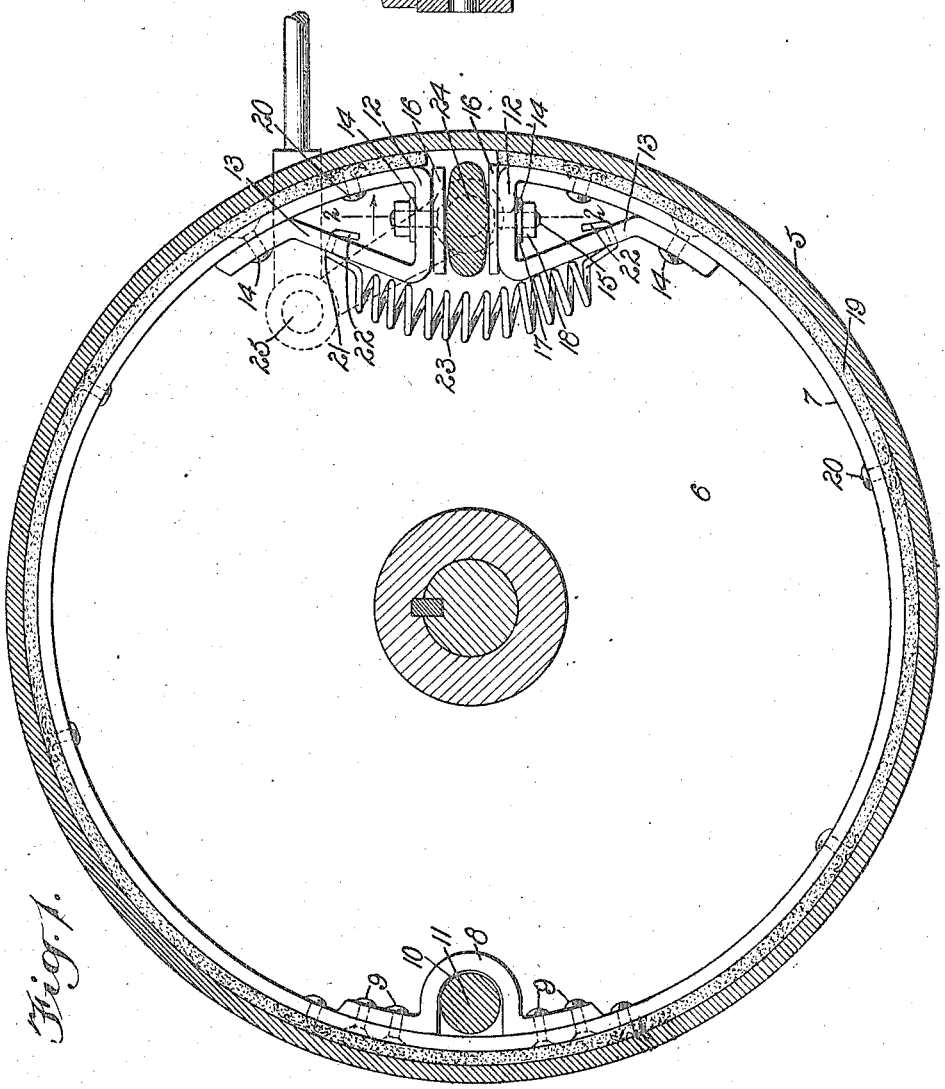
WITNESSES
INVENTOR
Elmer J. Lee
BY
ATTORNEYS

UNITED STATES PATENT OFFICE.

ELMER JESSE LEE, OF STROUDSBURG, PENNSYLVANIA, ASSIGNOR TO NEVER-BREAK PRODUCTS COMPANY, OF BANGOR, PENNSYLVANIA, A CORPORATION OF PENNSYLVANIA.

BRAKE.

1,264,820.  Specification of Letters Patent.  Patented Apr. 30, 1918.

Application filed August 22, 1916. Serial No. 116,365.

*To all whom it may concern:*

Be it known that I, ELMER J. LEE, a citizen of the United States, and a resident of Stroudsburg, in the county of Monroe and State of Pennsylvania, have invented a new and Improved Brake, of which the following is a full, clear, and exact description.

My invention has for its object to provide a brake particularly well adapted for use on automobiles, and in which the brake shoe is provided with integral jaws which are bent back and riveted to the body of the brake shoe, shims being detachably mounted on the jaws for engagement by the brake cam, so that a lining or wearing member on the brake shoe may always be disposed relatively to the brake drum in the best operative position.

Additional objects of the invention will appear in the following specification in which the preferred form of the invention is disclosed.

In the drawings similar reference characters denote similar parts in all the views, in which—

Figure 1 is a sectional elevation illustrating a brake drum and a brake shoe provided with my improvement; and Fig. 2 is a sectional view on the line 2—2 of Fig. 1.

By referring to the drawings, it will be seen that within a brake drum 5 which is mounted on a wheel having a housing 6, a brake shoe 7 is disposed, this brake shoe 7 being in the form of a split spring ring and being provided with a bracket 8 which is secured to the brake shoe by rivets 9, the bracket 8 having a bearing 10 in which is disposed a bolt 11, this bolt being mounted on the housing 6. It will be noted that the bearing 10 of the bracket 8 is not circular, but is elongated. This is for the purpose of permitting the bracket and the shoe portion to which the bracket is secured, to have a slight movement toward and away from the center of the wheel, so that the portion of the brake shoe immediately in the rear of the pin or bolt 11 will frictionally engage the drum 5, as well as those portions of the shoe which are near the ends of the shoe on the opposite side of the center.

The brake shoe 7 is provided with two jaws 12 which are integral with the brake shoe and which extend inwardly from the body of the brake shoe, the jaws 12 being provided with rearwardly extending terminals 13 which are riveted to the body of the brake shoe 7 at 14. By this construction the jaws of the brake shoe 7 are readily constructed, and are very strong, so that there is no danger of the jaws bending under severe strains. In each jaw 12 there is a bearing 14 in which is disposed a bolt 15, the bolt 15 extending inwardly through an opening in a shim 16 and then through the bearing 14. As will be seen from the drawing, the shim is provided with a conical recess into which the head of the bolt is countersunk. A lock washer 17 and a nut 18 are mounted on each of the bolts 15, so that the shims 16, one on each of the jaws 12, will be held in position. It will be understood that with this construction the shims may be removed and larger shims may be substituted therefor, or, if desired, a plurality of shims may be mounted on each of the jaws 12. This arrangement is provided to take up any wear of the lining or wearing member 19 which is secured by rivets 20 to the outer face of the brake shoe 7. When this lining or wearing member 19 has been worn down, larger, or a greater number of shims 16 may be mounted on the faces of the jaws 12, to hold the brake shoe 7 with its lining or wearing member 19 in position to contact with the brake drum 5 under the best conditions.

In the terminals 13 which extend rearwardly from the jaws 12, there are openings 21 through which are disposed the terminals 22 of a spring 23. In this way the ends of the spring 23 are secured to the terminals 13 of the jaws 12, which serve to draw the jaws 12 with the ends of the brake shoe 7 in the direction of each other until they engage the shims 16, so that ordinarily the lining or wearing member 19 on the brake shoe 7 will not actively engage the brake drum 5.

Between the shims 16 there is disposed a brake cam 24 which when turned presses the shims 16 outwardly, by which means the lining or wearing member 19 on the brake shoe 7 is forced into active engagement with the brake drum 5. The brake cam 24 is journaled in the housing 6, and is rotated by any suitable means, such as a lever 25.

Having thus described my invention, I claim as new and desire to secure by Letters Patent:

1. In a brake, a brake shoe having integral jaws bent inwardly and then back to the body of the brake shoe where they are secured, and a brake cam disposed between the jaws, for the purpose specified.

2. In a brake, a brake shoe having integral jaws bent inwardly and then back to the body of the brake shoe, a brake cam disposed between the jaws, and a spring having its terminals secured to the jaws, for the purpose specified.

3. In a brake, a brake shoe having integral jaws bent inwardly and then back to the body of the brake shoe where they are secured, and a brake cam disposed between the jaws, shims, and means for detachably securing the shims to the faces of the jaws.

4. In a brake, a circular brake shoe, a bracket secured to the brake shoe and having a bearing, an axle housing, a bolt journaled in the bearing and secured to the axle housing, the brake shoe having integral jaws bent inwardly and then back to the body of the brake shoe where they are secured, and a brake cam secured between the jaws, for the purpose specified.

5. In a brake, a circular brake shoe, a bracket secured to the brake shoe and having a bearing, an axle housing, a bolt journaled in the bearing and secured to the axle housing, the brake shoe having integral jaws bent inwardly and then back to the body of the brake shoe where they are secured, and a brake cam secured between the jaws, shims, means for detachably securing the shims to the faces of the jaws, and a spring having its terminals secured to the jaws, for the purpose specified.

6. In a brake, a brake shoe comprising a split spring ring, the ends of the ring being bent inwardly and then back to the body portion of the brake shoe where they are secured, and a brake cam disposed between the inwardly bent portions.

7. In a brake, a brake shoe comprising a split spring ring, the ends of the ring being bent inwardly and then back to the body portion of the brake shoe where they are secured, a brake cam disposed between the inwardly bent portions, and a shim carried by each inwardly bent portion on the surface facing the cam, and means for detachably holding the shims in position.

8. In a brake, a brake shoe comprising a split spring ring, the ends of the ring being bent inwardly and then back to the body portion of the brake shoe where they are secured, a brake cam disposed between the inwardly bent portions, and a shim carried by each inwardly bent portion on the surface facing the cam, means for detachably holding the shims in position, said last named means comprising a bolt arranged to pass through each of said inwardly extended portions, and a nut disposed on the bolt in the loop formed by the inwardly and backwardly bent portions.

9. In a brake, a brake shoe comprising a split spring ring, the ends of the ring being bent inwardly and then back to the body portion of the brake shoe where they are secured, a brake cam disposed between the inwardly bent portions, and a shim carried by each inwardly bent portion on the surface facing the cam, means for detachably holding the shims in position, said last named means comprising a bolt arranged to pass through each of said inwardly extended portions, and a nut disposed on the bolt in the loop formed by the inwardly and backwardly bent portions, each of said shims being provided with a recess and the head of the bolt being countersunk in the recess.

10. In combination with an annular flange on a wheel hub, a brake shoe consisting of a severed ring of spring material having the severed ends widened radially, said shoe being located within said annular flange and supported upon a fixed pin passing through a radially slotted hole in said shoe; a cam positioned between the severed ends of said shoe and means for actuating said cam to further separate the ends of the shoe and expand the latter to contact with said annular flange.

11. In combination with an annular flange on a wheel hub, a brake shoe consisting of a severed ring of spring material having the severed ends widened radially, said shoe located within said annular flange and supported upon a fixed pin passing through a radially slotted hole in said shoe diametrically opposite to the severed ends; a strip of frictional material secured on the outer periphery of said shoe; a cam positioned between the severed ends of said shoe, and means for actuating said cam to further separate the ends of the shoe and expand the latter to contact with said annular flange.

ELMER JESSE LEE.

Witnesses:
 JOHN S. HUFFORD,
 FRANK H. ALLEGER.